United States Patent [19]

Hubert et al.

[11] 4,221,759

[45] Sep. 9, 1980

[54] PROCESS FOR THE PRODUCTION OF HOLLOW ARTICLES FROM PREFORMS OF A THERMOPLASTIC

[75] Inventors: Guy Hubert, Lasne-Chapelle-Saint-Lambert; Philippe Ghyselinck, Braine-l'Alleud, both of Belgium

[73] Assignee: Solvay & Cie., Brussels, Belgium

[21] Appl. No.: 965,887

[22] Filed: Dec. 4, 1978

[30] Foreign Application Priority Data

Dec. 5, 1977 [FR] France .................... 77 36798

[51] Int. Cl.² .............................. B29C 17/07
[52] U.S. Cl. ................... 264/520; 264/528; 264/533; 425/525; 425/526; 425/535
[58] Field of Search ............ 264/520, 528, 530, 535, 264/533; 425/525, 526, 530, 535

[56] References Cited

U.S. PATENT DOCUMENTS

| 3,114,596 | 12/1963 | Wechsler et al. | 264/520 |
| 3,502,758 | 3/1970 | Plummer | 264/520 |
| 3,717,429 | 2/1973 | Peters et al. | |
| 3,767,747 | 10/1973 | Uhlig | 264/530 |
| 3,969,060 | 7/1976 | Rosenkranz et al. | 425/535 X |

FOREIGN PATENT DOCUMENTS 1479200 5/1969 Fed. Rep. of Germany .
2080622 11/1971 France .
2150344 4/1973 France .

Primary Examiner—Jan H. Silbaugh
Attorney, Agent, or Firm—Spencer & Kaye

[57] ABSTRACT

A process for the production of hollow articles from preforms of a thermoplastic material, one open end of which preforms has a neck moulded at least partially into its definitive shape. During the final blowing operation, the region corresponding to the moulded part of the preform is isolated from the remainder of the interior of the preform. The isolated region is cooled by sweeping with a cooling fluid.

10 Claims, 2 Drawing Figures

PROCESS FOR THE PRODUCTION OF HOLLOW ARTICLES FROM PREFORMS OF A THERMOPLASTIC

BACKGROUND OF THE INVENTION

The present invention relates to a process for the production of hollow articles from preforms of a thermoplastic, one open end of which preforms possesses a neck moulded at least partially into its definitive shape.

Numerous processes for the production of hollow articles from a thermoplastic are known which comprise two stages, namely the production of a preform from the thermoplastic used, and the final moulding of this preform, for example by blowing, to give the desired final hollow article.

These processes are commonly used for the production of hollow articles by the so-called injection-blowing technique, in which the intermediate preform is produced by injection moulding.

These processes are also applicable to the production of molecularly oriented hollow articles in which it is often necessary to produce preforms which must undergo a well-defined heat treatment in order to induce orientation stresses into their wall during the subsequent final moulding. Such preforms can be produced by various techniques and especially by injection moulding or blow-moulding.

It is desirable to provide preforms having an open neck moulded at least partially into its definitive shape, because during the information of the preforms the thermoplastic is at an ideal temperature to allow precise moulding of details such as threads, orifice rings and the like, which frequently determine the quality of the hollow articles finally obtained. In fact, during the production of oriented hollow articles the preforms are, after heat conditioning, generally no longer at a temperature which allows precise moulding of such details during the final blowing. The same is often true of the production of non-oriented hollow articles by the injection-blowing technique because the thermoplastic material is cooled during the injection moulding of the preform and during the transfer of the latter to the final blow-mould.

Consequently, it is frequently necessary to blow preforms having an orifice ring moulded into its definitive shape, or having other details such as threads, or even to blow preforms of which the neck is completely moulded into its definitive shape. These preforms, where necessary after a heat treatment, are enclosed in a final blow-mould and brought to their definitive shape by blowing by means of an expansion fluid which is introduced into the preforms through a blowing nozzle which enters the interior of the preforms through their open end. This final blow-moulding can furthermore be preceded by longitudinal stretching of the preforms, for example by means of an internal stretching piston which slides in the blowing nozzle, during the production of oriented hollow articles.

In all cases, the wall of the preforms undergoes longitudinal stretching during the final blowing and regardless of the means employed hitherto, it is found that this stretching results in a deformation of the already moulded part of the neck of the preform. Hence, a part of the advantage achieved by moulding this part during the manufacture of the preform, namely greater precision, is lost.

It is, therefore, an object of the present invention to prevent deformation of the already moulded part of the neck of the preform when preform undergoes longitudinal stretching during the final blowing stage.

SUMMARY OF THE INVENTION

The objects of the invention are achieved by isolating, during the final blowing operation, the region corresponding to the moulded part of the preform from the remainder of the interior of the preform, and in cooling the isolated region by sweeping it with a cooling fluid.

The present invention hence relates to a process for the production of hollow articles from preforms of a thermoplastic, of which one open end possesses a neck moulded at least partially into its definitive shape, in which the moulding is effected by blowing by means of an expansion fluid introduced into the preforms, enclosed in a mould, through a blowing nozzle which enters the interior of the preforms through their open end, and in which, during the introduction of the blowing nozzle, the region of the interior of the preforms between the nozzle and the moulded part of the neck of the preforms is isolated from the remainder of the interior of the preforms and the isolated region is cooled by sweeping with a cooling fluid.

The process according to the invention can be advantageously practiced in all the techniques of production of hollow articles from preforms which possess a neck moulded at least partially into its definitive shape, and especially in the techniques of blow-moulding of oriented hollow articles which employ such preforms, even if these latter techniques in addition comprise a stage of longitudinal stretching of the preforms before or during their final blowing.

The preforms which can be used for carrying out the process according to the invention can be produced by any known means and in particular by injection moulding or by blow-moulding. The neck of the preforms can be partially or completely moulded into its definitive shape during the production of the preforms.

The isolation of the region between the nozzle and the moulded part of the neck of the preforms from the remainder of the interior of the preforms during the introduction of the blowing nozzle can be achieved by any means which allows a seal to be obtained between the part of the nozzle above the blowing orifice of the latter and the part of the nozzle below the mouled part of the neck of the preforms. According to a preferred embodiment, the blowing nozzle can advantageously be equipped with a peripheral ring for internal calibration, which acts directly below the moulded part of the neck of the preforms and which compresses the thermoplastic, at this level, against the wall of the mould cavity during the introduction of the blowing nozzle into the preforms. The calibrating ring in this case makes it possible to regulate the orifice diameter of the neck of the final hollow article while ensuring a perfect seal between the moulded region of the neck of the preforms and the remainder of the preforms, that is to say, the part of the preforms subjected to expansion during the final blowing.

The cooling fluid which, by sweeping, provides internal cooling of the moulded region of the neck of the preforms, can be any cooling fluid provided it is inert towards the thermoplastic of which the preforms consist and provided it is at a temperature which is below, preferably more than 50° C. below, the temperature of the moulded part of the neck of the preforms during the introduction of the nozzle. In particular it is possible to use, for this purpose, liquids such as water or preferably cold gases such as, for example, nitrogen obtained by expansion of liquified nitrogen.

The cooling fluid is introduced through the blowing nozzle opposite the moulded part of the neck of the preforms. In order to optimize the cooling of these parts it is desirable to render the sweeping as efficient as possible by, for example, ensuring that the fluid introduced can escape freely, for example through an annular orifice delimited by the open end of the preforms and by the blowing nozzle, and by regulating the flow-rate of the cooling fluid so as to allow the removal of a large amount of heat. Cooling by sweeping can be provided from the moment the blowing nozzle is introduced into the preforms and in any case before the start of the introduction of the blowing fluid. Cooling can, if desired, be continued during the final blowing but can also be interrupted when the final blowing operation starts.

The duration of cooling by sweeping can vary within wide limits. In general, sweeping is continued for at least one second. Furthermore, the time staggering between sweeping and blowing is in general at least one second.

The selection of the working conditions for cooling by sweeping in fact does not present any difficulty and can easily be made experimentally, the conditions being made progressively more severe until the part of the finally obtained hollow articles which corresponds to the moulded part of the neck of the preforms has a satisfactory appearance.

According to a preferred embodiment of the process according to the invention, the cooling fluid employed is the expansion fluid used for the final moulding of the preforms. In this case, the channel provided at the center of the blowing nozzle to allow the introduction of this fluid into the preforms to be moulded possesses branches for directing a part of this expansion fluid towards the region which is to be cooled by sweeping. Means such as, for example, electromagnetic valves can be provided to channel the expansion fluid solely towards these branches during the introduction of the blowing nozzle into the preforms and subsequently either simultaneously towards the branches and towards the blowing orifice through which the expansion fluid enters the preforms, or solely towards this orifice. In general, it is more advantageous to give preference to the latter possibility so as to avoid undesirable pressure losses of the expansion fluid during final blowing.

The cooling fluid is introduced so as to cool the isolated region and more particularly the internal wall of the moulded part of the neck of the preforms. The cooling fluid can in particular be introduced through annular slots judiciously provided over the periphery of the blowing nozzle or through radial orifices arranged in rings over the periphery of the blowing nozzle.

The process according to the invention is furthermore explained in more detail in the description, which now follows, of a practical embodiment given purely by way of illustration.

DESCRIPTION OF THE PREFERRED EMBODIMENTS

Figure 1:
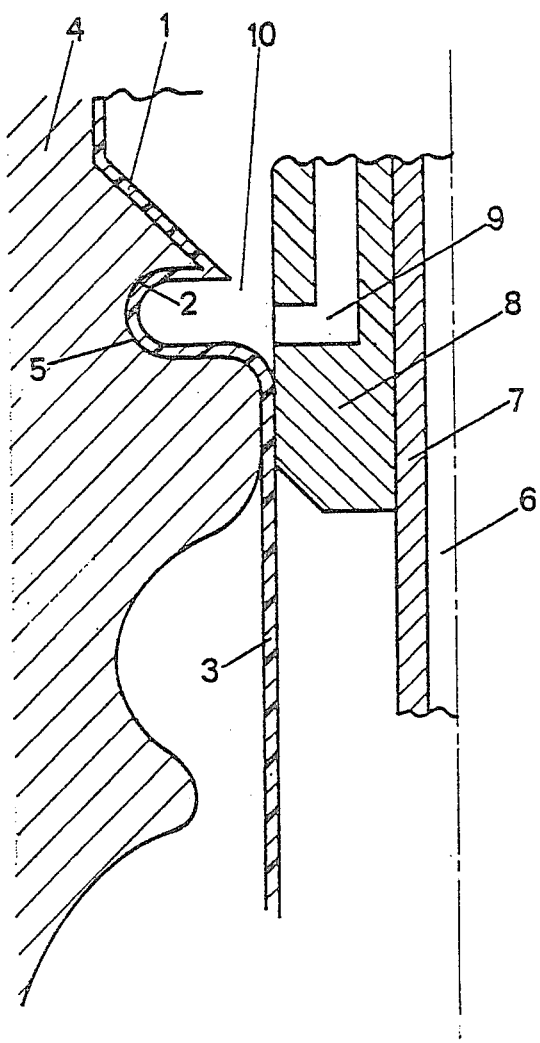
FIG. 1 is a cross-sectional, elevational view of an assembly consisting of a final blow mould and a blowing nozzle suitable for carrying out the process according to the invention.

As is shown in FIG. 1, the preform employed, which has beforehand been produced by, for example, blow-moulding, possesses an open false spout 1, a neck orifice ring 2 moulded into its definitive shape, and a cylindrical body 3 which is preferably closed at its lower end.

The preform is inserted into the final blow-mould 4, the impression of which comprises a cavity 5 which permits precise seating of the neck orifice ring 2 of the preform.

The blowing nozzle possesses a central channel 6 for the introduction of the expansion fluid into the preform, a piston 7 for longitudinal stretching of the preform, a calibrating ring 8 and radial channels 9 for directing the cooling fluid.

During the introduction of the blowing nozzle into the preform, the calibrating ring 8 comes up against the internal wall of the preform and hence isolates the region delimited by the moulded part 1, 2 of the preform from the remainder of the interior, corresponding to part 3 of the preform. Furthermore, the radial channels 9 are directed towards the internal wall of the neck orifice ring 2 of the preform.

When the nozzle has been introduced into the preform, and before proceeding to the final moulding, means which are not shown channel a cooling fluid, which can, as has been stated, be the expansion fluid itself, into the radial channels 9 and this fluid provides intense cooling, by sweeping, of the isolated region. The cooling fluid injected through the radial channels 9 can escape freely through the annular orifice 10 delimited by the open end of the preform and by the blowing nozzle.

After a certain period of time, which in each practical case can be decided by exploratory experiments, the final moulding sequence by stretching the preform by means of the stretching piston 7, and by blowing by means of the expansion fluid introduced through the channel 6 is started, the cooling, by sweeping, of the neck orifice ring 2 being either continued or stopped, as desired, during this latter sequence.

Figure 2:
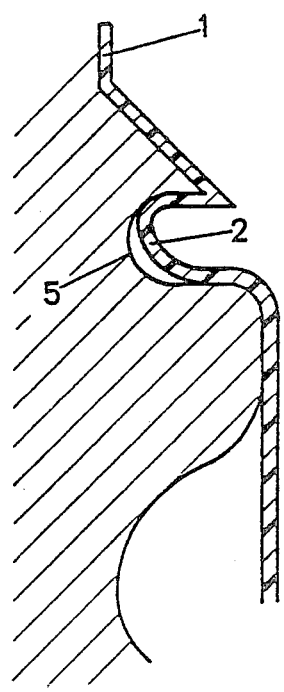
FIG. 2 is a cross-sectional elevational view of an assembly consisting of a final blow mould showing the deformation of the neck orifice of the hollow articles obtained when refrigeration operation of the present invention is not carried out.

In practicing the process which has just been described it is possible, starting from preforms of the type illustrated in FIG. 1, to produce oriented hollow articles of which the neck orifice ring 2 shows no alteration whatsoever after final blowing. In contrast, if the refrigeration operation was omitted, it was found that the majority of the oriented hollow articles obtained exhibited a neck orifice ring showing deformation of the type illustrated in FIG. 2.

The hollow articles obtained by the process according to the invention can be used for numerous applications and especially for the packaging of liquids.

It will be understood that the above description of the present invention is susceptible to various modifications, changes and adaptations, and the same are intended to be comprehended within the meaning and range of equivalents of the appended claims.

What is claimed is:

1. In a process for the moulding of hollow articles from preforms of a thermoplastic material, of which one open end has a neck moulded at least partially into its definitive shape, in which the moulding of said hollow article is effected by blowing by means of an expansion fluid introduced into the preforms, enclosed in a mould, through a blowing nozzle which enters the interior of the preforms through their open end to be spaced from the moulded part of the neck of the preforms so as to create a region at the interior of the preforms between the nozzle and the moulded part of the neck of the preforms, said region extending to the open end of the preforms, the improvement comprising: during the introduction of the blowing nozzle, isolating the region at the interior of the preforms between the nozzle and the moulded part of the neck of the preforms from the remainder of the interior of the preforms, and cooling said isolated region by introducing cooling fluid into said isolated region through said blowing nozzle and removing the cooling fluid through an annular orifice delimited by the open end of said preforms and by said blowing nozzle to thereby sweep said isolated region with the cooling fluid.

2. A process according to claim 1, wherein the cooling is continued during the operation of blowing the hollow articles.

3. A process according to claim 1, wherein the cooling is interrupted when starting the blowing operation of the hollow articles.

4. In a process for the production of hollow articles from preforms of a thermoplastic material, of which one open end has a neck moulded at least partially into its definitive shape, in which the moulding of said hollow article is effected by blowing by means of an expansion fluid introduced into the preforms, enclosed in a mould, through a blowing nozzle which enters the interior of the preforms through their open end to be spaced from the moulded part of the neck of the preforms so as to create a region at the interior of the preforms between the nozzle and the moulded part of the neck of the preforms, the improvement comprising: during the introduction of the blowing nozzle, isolating the region at the interior of the preforms between the nozzle and the moulded part of the neck of the preforms from the remainder of the interior of the preforms, cooling the isolated region by sweeping with a cooling fluid, and interrupting said cooling when starting the blowing operation of said hollow articles.

5. A process according to claim 1 or 4, wherein the blowing nozzle is equipped with a peripheral ring for internal calibration, which acts directly below the moulded part of the neck of the preforms and which compresses the thermoplastic material, at this level, against the wall of the mould cavity during the introduction of the blowing nozzle into the preforms.

6. A process according to claim 1 or 4, comprising using a liquid as the cooling fluid.

7. A process according to claim 1 or 4, comprising using a gas as the cooling fluid.

8. A process according to claim 1 or 4, comprising using the expansion fluid used to blow the preforms as the cooling fluid.

9. A process according to claim 1 or 4, wherein the cooling of the isolated region is put into operation at least one second before the blowing of the hollow articles.

10. A process according to claim 1 or 4, wherein the cooling is continued for at least one second.

* * * * *